United States Patent
Kreisig et al.

(10) Patent No.: US 9,790,987 B2
(45) Date of Patent: Oct. 17, 2017

(54) BEARING ARRANGEMENT

(71) Applicant: Mahle International GmbH, Stuttgart (DE)

(72) Inventors: Michael Kreisig, Stuttgart (DE); Falk Schneider, Korntal-Muenchingen (DE)

(73) Assignee: Mahle International GmbH (DE)

( * ) Notice: Subject to any disclaimer, the term of this patent is extended or adjusted under 35 U.S.C. 154(b) by 62 days.

(21) Appl. No.: 14/198,238

(22) Filed: Mar. 5, 2014

(65) Prior Publication Data
US 2014/0251257 A1 Sep. 11, 2014

(30) Foreign Application Priority Data
Mar. 6, 2013 (DE) .................. 10 2013 203 842

(51) Int. Cl.
| | |
|---|---|
| F01L 1/34 | (2006.01) |
| F16C 33/18 | (2006.01) |
| F16C 21/00 | (2006.01) |
| F01L 1/344 | (2006.01) |
| F01L 1/047 | (2006.01) |
| F16C 17/02 | (2006.01) |
| F16C 17/04 | (2006.01) |
| F16C 17/10 | (2006.01) |

(Continued)

(52) U.S. Cl.
CPC .............. *F16C 21/00* (2013.01); *F01L 1/047* (2013.01); *F01L 1/344* (2013.01); *F01L 1/3442* (2013.01); *F16C 17/02* (2013.01); *F16C 17/04* (2013.01); *F16C 17/10* (2013.01); *F01L 2001/0476* (2013.01); *F16C 19/46* (2013.01); *F16C 33/201* (2013.01); *F16C 2240/46* (2013.01); *F16C 2360/18* (2013.01)

(58) Field of Classification Search
CPC .. F16C 3/02; F16C 21/00; F16C 17/02; F16C 9/02; F16C 35/077; F16C 33/1065; F16C 17/04; F16C 17/10; F16C 19/46; F16C 33/201; F16C 2240/46; F01L 2001/0476; F01L 1/3442; F01L 1/047; F01L 1/344
USPC .................. 123/90.17, 90.37, 90.15, 198 DA
See application file for complete search history.

(56) References Cited

U.S. PATENT DOCUMENTS

| | | | | |
|---|---|---|---|---|
| 5,074,040 | A | * | 12/1991 | Nisley ................... F16C 23/084 29/898.066 |
| 6,634,791 | B2 | * | 10/2003 | Ono ..................... F16C 33/1065 384/288 |
| 2006/0251348 | A1 | | 11/2006 | Egami et al. |

(Continued)

FOREIGN PATENT DOCUMENTS

| | | |
|---|---|---|
| DE | 102005045290 A1 | 10/2006 |
| DE | 102009013071 * | 9/2010 |

(Continued)

OTHER PUBLICATIONS

English abstract for DE-102005045290.
German Search Report for DE102013203842.9, dated Jan. 17, 2014.

*Primary Examiner* — Syed O Hasan
(74) *Attorney, Agent, or Firm* — Fishman Stewart PLLC

(57) ABSTRACT

A bearing arrangement for a camshaft may include a bearing ring arranged between two functional elements. The bearing ring may be supported with respect to the functional elements via axial front sides. At least one of the axial front sides of the bearing ring and a side of the respective functional elements in sliding contact with the axial front side may have a polymer coating.

20 Claims, 1 Drawing Sheet

(51) Int. Cl.
*F16C 19/46* (2006.01)
*F16C 33/20* (2006.01)

(56) References Cited

U.S. PATENT DOCUMENTS

| | | | |
|---|---|---|---|
| 2007/0220875 A1* | 9/2007 | Akamatsu | F16D 41/07 60/345 |
| 2007/0298259 A1* | 12/2007 | Matsumoto | B01J 13/18 428/407 |
| 2008/0289592 A1* | 11/2008 | Flender | F16C 35/077 123/90.6 |
| 2009/0133529 A1 | 5/2009 | Kister et al. | |
| 2010/0129023 A1 | 5/2010 | Lemaitre et al. | |
| 2011/0265756 A1 | 11/2011 | Flender et al. | |
| 2012/0008893 A1* | 1/2012 | Oishi | F16C 9/02 384/570 |
| 2012/0037103 A1* | 2/2012 | Schneider | F01L 1/047 123/90.1 |

FOREIGN PATENT DOCUMENTS

| | | | |
|---|---|---|---|
| DE | 102010019130 A1 | 11/2011 | |
| NL | DE102009013071 | * | 3/2009 |

* cited by examiner

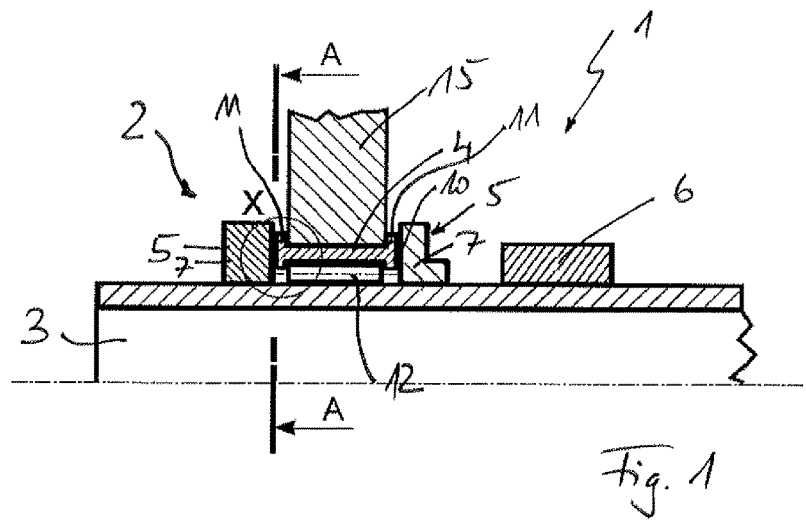
Fig. 1
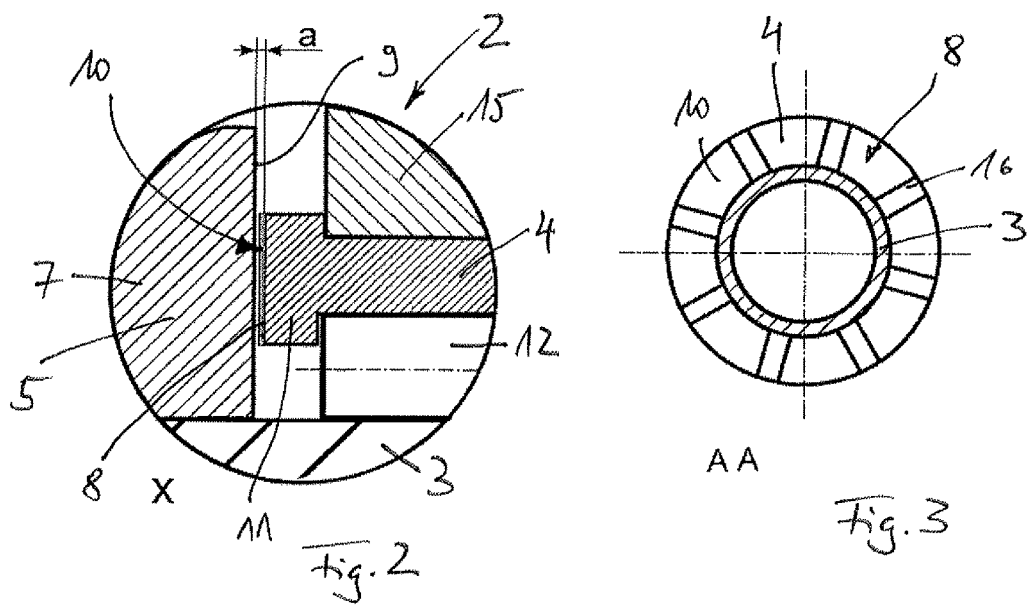
Fig. 2
Fig. 3
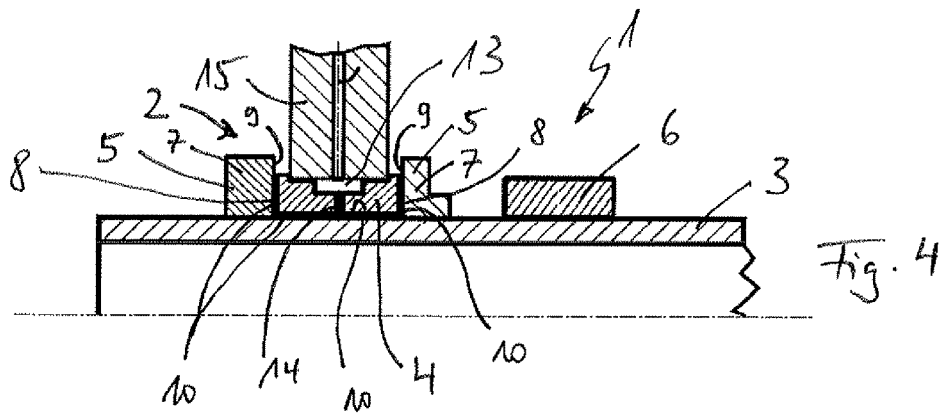
Fig. 4

BEARING ARRANGEMENT

CROSS-REFERENCE TO RELATED APPLICATIONS

This application claims priority to German Patent Application No. 10 2013 203 842.9, filed Mar. 6, 2013, the contents of which are hereby incorporated by reference in their entirety.

TECHNICAL FIELD

The present invention relates to a bearing arrangement of a camshaft in an internal combustion engine, comprising a bearing ring.

BACKGROUND

From WO 2010/066396 A1, for example, a bearing arrangement comprising a polymer-coated sliding bearing is known, wherein the polymer coating, on the one hand, facilitates the mounting and thereby should save energy, and, on the other, it should help to design the bearing arrangement overall in a more cost-effective manner.

From EP 2 078 829 B1, a bearing arrangement of a camshaft in an internal combustion engine is known, wherein for facilitating the mounting, an axial bearing and also a radial bearing are configured as an antifriction bearing.

From EP 2 065 603 B1, a bearing arrangement is known that comprises antifriction bearings so as to facilitate the mounting.

Antifriction bearings are generally regarded as low-friction since they are independent of oil viscosities, and as a result, constantly low friction can be achieved even under start-stop conditions. This cannot be ensured in all operating states by sliding bearings. In addition, high oil pressure or high oil consumption is required which, in turn, requires high pump capacity. However, antifriction bearings, in particular ball bearings, have the disadvantage that they require a comparatively large installation space, which, in particular in modern engine compartments, is often not implementable. To be regarded as the only solution to this problem can be, for example, rolling elements which run directly on the camshaft and have outer bearing rings that are fixedly assembled in a cylinder head, and which have a comparatively small installation space required in the radial direction. If, in contrast, an axial bearing is also provided as an antifriction bearing, this requires a radially larger installation space since in this case, an inner bearing ring is also required and, moreover, the forces to be supported result in the need of a certain size of rolling elements. Dispensing with the inner bearing ring that is required for this purpose would, one the one hand, save some installation space but, on the other, would require complex machining of the camshaft, which, in turn, is expensive.

SUMMARY

The present invention is therefore concerned with the problem of providing an improved embodiment for a bearing arrangement which enables both a radial bearing and an axial bearing while requiring a comparative small installation space.

This problem is solved according to the invention by the subject matters of the independent claims. Advantageous embodiments are subject matter of the dependent claims.

The present invention is based on the general concept of using a bearing ring for mounting a camshaft in an internal combustion engine, which bearing ring is arranged between two functional elements of the camshaft and is supported at the same time with respect to these functional elements via axial front sides, wherein for facilitating the mounting, at least the axial front sides of the bearing ring and/or those sides of the functional elements that are in sliding contact therewith have a polymer coating. This enables a comparatively small-sized axial bearing for the camshaft which, due to the polymer coating provided according to the invention, also enables a constantly low friction even under start-stop conditions, namely in particular independent of oil viscosities. For easier radial mounting of the camshaft, the bearing ring can also form a radial sliding bearing for the camshaft, whereby a particularly small installation space can be achieved, or, rolling elements, for example roller bodies, can be arranged between the bearing ring and the camshaft, as a result of which the radial bearing is formed as an antifriction bearing. With the bearing arrangement according to the invention, thus, on the one hand, a cost-effective bearing and, on the other, at the same time, a small-sized but extremely smooth-running bearing can be achieved, which is of decisive advantage in a modern motor vehicle, and here in particular for the mounting of the camshaft.

Advantageously, the bearing ring has a double-T-shaped cross-section with lateral shoulders, wherein rolling elements, for example roller bodies, are arranged between the bearing ring and the camshaft. The double-T-shaped cross-section enables, on the one hand, guidance for the rolling elements arranged between the bearing ring and the camshaft and, at the same, fixation of the bearing on a cylinder head, for which reason the bearing ring engages with its shoulders around a corresponding section on the cylinder head. On axial front sides of the bearing ring, the latter preferably has the polymer coating mentioned in the preceding paragraph, through which the smooth-running sliding mounting with respect to the adjacent functional elements, for example a drive wheel and a cam, can be achieved.

In another advantageous embodiment of the solution according to the invention, the bearing ring is formed as a sliding bearing and slides on the surface of the camshaft, wherein in this case, the bearing ring has a circumferential oil groove and additional radial oil passage openings on its outside. Hereby, the oil groove and therefore the bearing ring can be supplied with oil via the cylinder head, whereby the sliding mounting in particular of the camshaft in the bearing ring can be significantly improved so that even start-stop conditions, which are difficult to handle, can be easily handled.

In another advantageous embodiment of the solution according to the invention, the polymer coating comprises metallic particles and/or polytetrafluoroethylene (PTFE) in a concentration of 1-15% by volume. By admixing such particles, for example PTFE particles, the chemical resistance of the polymer coating can be increased again since in particular PTFE has high resistance with respect to aggressive chemicals. Moreover, polytetrafluoroethylene has the great advantage that the static friction thereof is equal to the sliding friction so that the transition from standstill to movement can take place without jerk, which is of great advantage in particular in motor vehicles with start-stop strategy. Of course, it is also conceivable to form the polymer coating entirely from PTFE.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical or similar or functionally identical components.

BRIEF DESCRIPTION OF THE DRAWINGS

In the figures, schematically:

FIG. 1 shows a sectional view through a bearing arrangement according to the invention, FIG. 2 shows a detailed illustration of the region X, FIG. 3 shows a sectional view along the sectional plane A-A, FIG. 4 shows a view as in FIG. 1, but of a bearing ring that is configured differently.

DETAILED DESCRIPTION

According to FIG. 1, an internal combustion engine 1 has a bearing arrangement 2 according to the invention for a camshaft 3, wherein the bearing arrangement 2 has a bearing ring 4 that is arranged between two functional elements 5 of the camshaft 3. Said functional elements 5 can be formed, for example, as a cam 6, a drive wheel, an assembly aid, a gearwheel, a rotary sensor or a limit stop 7. As is apparent from the FIGS. 1, 2 and 4, the bearing ring 4 is supported with respect to the functional elements 5 via its axial front sides 8, wherein for easier mounting and in particular also for implementing so-called start-stop strategies, at least the axial front sides 8 of the bearing ring 4 and/or those sides 9 of the functional elements 5 that are in sliding contact therewith have a polymer coating 10.

When viewing the FIGS. 1 and 2, it can be seen that the bearing ring 4 has a double-T-shaped cross-section, usually also referred to as I-cross-section, with lateral shoulders 11, wherein between the bearing ring 4, on the one hand, and the camshaft 3, on the other, rolling elements 12, for example roller bodies, are arranged. By way of these rolling elements 12, a radial roller bearing can be achieved, whereby a particularly smooth-running radial mounting of the camshaft 3 is enabled. The rolling elements 12 can be formed as needles and can run directly on the surface of the camshaft 3; the lateral shoulders 11 of the bearing ring 4 can be provided such that in the radial direction, they are formed only in the direction of the cylinder head 15, that is, towards the outside, and therefore do not guide the rolling elements 12. In FIG. 1, this simply would mean that the T-shaped shoulders 11 are merely formed as L-shaped shoulders 11 and project radially outwards.

The polymer coating 10 can comprise, for example, polyimide, acrylate, polytetrafluoroethylene (PTFE) or epoxy resin, wherein it is of course also conceivable to incorporate metallic particles and/or polytetrafluoroethylene particles, which are then contained in a preferred concentration of 1 to 15% by volume.

With the axial sliding bearing according to the invention, the axial installation space required can be reduced significantly. If, in addition, the radial installation space required is also to be reduced, the bearing ring 4 can generally be formed as a sliding bearing and can slide on the surface of the camshaft 3, wherein in this case, the bearing ring 4 has a circumferential oil groove 13 on its outside and, in addition, has radial oil passage openings 14 (cf. FIG. 4). In this case, the bearing ring 4 can be supplied with oil via a cylinder head 15. The surface of the camshaft 3 can be polymer-coated in the sliding/contact area, and/or the bearing ring 4 can be polymer-coated on its inside, in particular, with such a polymer coating 10.

When viewing the FIGS. 1 and 2, it can be seen that the bearing ring 4 engages with both of its shoulders 11 around a portion of the cylinder head 15 and thereby is fixed thereon.

The bearing ring 4 can be made from metal, for example. Preferably, the bearing ring 4 is arranged between a drive wheel and the first cam 6, wherein the bearing ring 4 is usually arranged with an axial play a of 30-50 µm with respect to the functional element 5. As an alternative to engaging around the portion of the cylinder head 15 by means of the shoulders 11, it is of course also possible to use separate fastening means, or fastening means that are integrated in the bearing ring 4 and engage in corresponding formations on the cylinder head 15. The functional elements 5 are usually fixedly connected to the camshaft 3, for example, are thermally joined therewith.

When viewing FIG. 3, it can be seen that the bearing ring 4, on its front sides 8, has oil supply grooves 16 which supply the tribological contact zone between the bearing ring 4 and the functional element 5 with an oil film which additionally facilitates the sliding mounting.

With the bearing arrangement 2 according to the invention it can be achieved that not only installation space is saved when mounting the camshaft 3, but, at the same time, a comparatively cost-effective bearing arrangement 2 is also achieved, which bearing arrangement, even without complex roller bearings, enables implementing start-stop strategies using sliding bearings due to the tribologically optimized polymer coating 10.

The invention claimed is:

1. A bearing arrangement for a camshaft, comprising: a bearing ring arranged between two receiving elements, the bearing ring including lateral shoulders and supported with respect to the receiving elements via axial front sides, and a polymer coating disposed on an axially facing contact surface of at least one of (i) the axial front sides of the bearing ring and (ii) a side of the respective receiving elements in sliding contact with the axial front sides; wherein the bearing ring includes a double-T-shaped cross-section forming an I-shaped cross section having the lateral shoulders projecting radially outwards; and wherein the polymer coating has a base material and includes a dispersion of polytetrafluoroethylene particles in a concentration of 1-15% by volume.

2. The bearing arrangement according to claim 1, wherein the lateral shoulders project radially outwards on each side thereof, and wherein rolling elements are arranged between the bearing ring and a surface of the camshaft.

3. The bearing arrangement according to claim 2, wherein the rolling elements include needles and run directly on the surface of the camshaft, wherein in a radial direction the respective lateral shoulders of the bearing ring extend in a direction away from the camshaft and do not guide the rolling elements.

4. The bearing arrangement according to claim 1, wherein the base material of the polymer coating includes at least one of polyimide, acrylate, polytetrafluoroethylene (PTFE) and epoxy resin.

5. The bearing arrangement according to claim 1, wherein at least one of:
   at least one receiving element includes a cam, a limit stop, a drive wheel, an assembly aid, a gearwheel and a rotary sensor, and
   the bearing ring is arranged between a drive wheel and a first cam.

6. The bearing arrangement according to claim 1, wherein the bearing ring is arranged having an axial play of 30-50 μm with respect to at least one receiving element.

7. The bearing arrangement according to claim 1, wherein the bearing ring includes a sliding bearing and slides on a surface of the camshaft, the bearing ring having a circumferential oil groove and at least one radial oil passage opening, and wherein at least one of the surface of the camshaft is polymer-coated in a sliding area and the bearing ring is polymer-coated on a side facing the surface of the camshaft.

8. The bearing arrangement according to claim 1, wherein the bearing ring has a plurality of oil supply grooves spaced circumferentially on at least one of the axial front sides.

9. An internal combustion engine, comprising: a camshaft having a longitudinal axis and at least two receiving elements each having an opening received by the camshaft; and a bearing arrangement, the bearing arrangement including a bearing ring arranged between the at least two receiving elements in an axial direction of the longitudinal axis, the bearing ring including lateral shoulders and supported with respect to the at least two receiving elements via at least two axial front sides, and a polymer coating disposed on an axially facing contact surface of at least one of (i) the at least two axial front sides of the bearing ring and (ii) a side of the respective receiving elements in sliding contact with the at least two axial front sides; wherein the bearing ring includes a double-T-shaped cross-section forming an I-shaped cross section having the lateral shoulders projecting radially outwards; wherein the polymer coating includes a dispersion of polytetrafluoroethylene particles in a concentration of 1-15% by volume; and wherein at least one axial front side of the at least two axial front sides includes a plurality of oil supply grooves spaced apart circumferentially and extending radially with respect to the longitudinal axis.

10. The internal combustion engine according to claim 9, wherein the lateral shoulders project radially outwards on each side thereof, and wherein rolling elements are arranged between the bearing ring and a surface of the camshaft.

11. The internal combustion engine according to claim 10, wherein the bearing ring is secured via the respective lateral shoulders on a cylinder head.

12. The internal combustion engine according to claim 10, wherein the rolling elements include needles and run directly on the surface of the camshaft, wherein in a radial direction of the longitudinal axis, the respective lateral shoulders of the bearing ring extend in a direction of a cylinder head and do not guide the rolling elements.

13. The internal combustion engine according to claim 9, wherein at least one of:
   the polymer coating includes at least one of polyimide, acrylate, polytetrafluoroethylene (PTFE) and epoxy resin, and
   the polymer coating further includes metallic particles in a concentration of 1-15% by volume.

14. The internal combustion engine according to claim 9, wherein the bearing ring is arranged having an axial play of 30-50 μm with respect to at least one receiving element.

15. The internal combustion engine according to claim 9, wherein at least one of the receiving elements is at least one of a cam, a limit stop, a drive wheel, an assembly aid, a gearwheel, and a rotary sensor.

16. The bearing arrangement according to claim 1, wherein the polymer coating further includes a dispersion of metallic particles; and
   wherein the axially facing surface of the polymer coating includes at least one of a front surface and a rear surface.

17. The bearing arrangement according to claim 1, wherein the polymer coating includes the dispersion of polytetrafluoroethylene particles.

18. The internal combustion engine according to claim 9, wherein the polymer coating has a base material that includes the dispersion of polytetrafluoroethylene particles in the concentration of 1-15% by volume.

19. The internal combustion engine according to claim 9, wherein the polymer coating has a base material and further includes a dispersion of metallic particles in a concentration of 1-15% by volume.

20. The internal combustion engine according to claim 9, wherein the bearing ring includes a circumferential oil groove on a side facing radially away from the camshaft and at least one radially extending oil passage disposed axially between the at least two axial front sides.

* * * * *